United States Patent Office 2,693,477
Patented Nov. 2, 1954

2,693,477

PROCESS FOR PREPARING CYANOACETIC ACID ESTERS OF STEROLS

Alfred R. Bader, Milwaukee, Wis., assignor to Pittsburgh Plate Glass Company, Pittsburgh, Pa., a corporation No Drawing. Application November 17, 1951, Serial No. 256,953

9 Claims. (Cl. 260—397.2)

The present invention relates to novel esters and methods of forming esters of cyanoacetic acid and alcohols and it has particular relation to novel methods of forming cyanoacetic acid esters of alcohols of relatively high molecular weight and to the novel ester products resulting from such method.

According to the present invention, it has been discovered that esters of alcohols having a relatively higher molecular weight (containing 12 or more carbon atoms) can be prepared in high purity and high yield by interacting under mild conditions an ester of a cyanoacetic acid and a lower aliphatic (preferably saturated) alcohol containing, for example, up to (and including) 4 carbon atoms and herein termed an interchangeable ester, with the alcohol of the ester desired particularly when such alcohol to be esterified has a higher boiling point than such lower alcohol (preferably at least 20° C. higher).

Novel and useful classes of esters have been prepared according to this invention. The sterol esters of cyanoacetic acid and substituted cyanoacetic acids are particularly valuable. Other valuable classes of esters of such acids and alcohols containing 12 or more carbon atoms have been prepared within the purview of this invention as will be apparent from the ensuing disclosure.

According to a further embodiment of the invention, it has been found that maximum yield and purity of ester is obtained when the evolved lower alcohol is swept rapidly from the reaction mixture or is otherwise reduced in concentration with respect to the original cyanoacetic acid ester. This may be accomplished by distilling the lower alcohol under conditions such that the partial pressure of the lower alcohol vapor in the system is maintained below atmospheric pressure. For example, the reaction mixture may be blown with an inert gas such as carbon dioxide, nitrogen, etc. to cause rapid distillation of evolved lower alcohol. Alternatively or in conjunction therewith, a subatmospheric pressure may be maintained over the reaction mixture to promote distillation of the evolved lower alcohol. These precautions are of special importance where the temperature of the reaction mixture is allowed to rise to a relatively high value, for example 120–160° C. However, pure products are generally obtained by recourse to these precautions even when the reaction temperature is below 120° C.

To insure good yields, excesses of the alcohol to be reacted with the cyanoacetic acid ester of the lower alcohol are to be avoided. Indeed, great excesses of the cyanoacetic acid ester component may be employed and if care is exercised to eliminate or at least sufficiently to reduce in the reaction zone the relative concentration of the alcohol freed with respect to the initial cyanoacetic acid ester, quantitative ester interchange of alcohol radicals can be attained.

The reaction involved may be represented by the general equation:

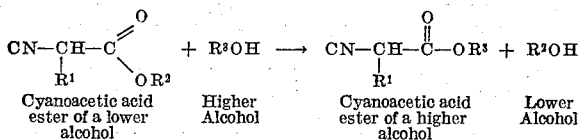

| Cyanoacetic acid ester of a lower alcohol | Higher Alcohol | Cyanoacetic acid ester of a higher alcohol | Lower Alcohol |

In the equation R¹ may be, and usually is, hydrogen, but it can also be hydrocarbon or substituted hydrocarbon (rarely containing more than six carbon atoms) such as methyl, ethyl, propyl, butyl, chloro, amino, chloromethyl, benzyl, phenyl, or the like derivatives thereof. At least one of the hydrogens linked to the alpha carbon atom in the cyanoacetic acid ester is unsubstituted.

The group R² is usually the labile radical which is adapted to be replaced in the ester interchange. These groups or radicals usually are of low molecular weight, e. g., 1, 2, 3, or possibly 4 carbon atoms in a saturated or unsaturated aliphatic substituted or unsubstituted hydrocarbon chain.

ALCOHOLS CAPABLE OF ESTER INTERCHANGE WITH LOWER ESTERS OF CYANOACETIC ACID

Many hydroxy compounds of relatively high molecular weight may be treated in accordance with the provisions of this invention with a lower ester of cyanoacetic acid to effect ester interchange reaction. Typical examples of these alcohols are represented in the last equation by the formula R³OH where OH is an alcoholic OH group and R³ contains in most cases 12, 16, 18, or more carbon atoms. In the formula, the alcohol is represented as being monohydric. However, it is also within the scope of this invention to effect ester interchange reaction under certain conditions hereinafter to be described, between cyanoacetic acid esters of lower alcohols and alcohols containing 2, 3, 4, 6, and more hydroxy groups in a single molecule. Obviously the alcohol must be soluble in the cyanoacetic acid ester, or at least the two must be soluble in a common, non-reactive solvent, e. g., toluene, xylene, etc.

The invention is especially directed to cyanoacetic esters of sterols and certain of the long chain alcohols and hydroxy compounds such as occur in or are derived from glyceride oils, tall oil, waxes, and wool fats and the like are outstanding examples of such compounds. It was quite surprising that these hydroxy compounds of such high molecular weight would so easily undergo ester interchange.

The sterols can be regarded as being derived from cyclopentanophenanthrene,

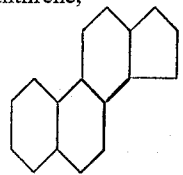

or its perhydro derivatives by appropriate shifting or replacement of hydrogen by hydroxyl or other groups and it may contain other substituted hydrocarbon groups or may be otherwise modified by dehydrogenation and such like changes familiar to the art.

The triterpene alcohols such as occurring in wool fat can similarly be regarded as being hydroxy derivatives of picene

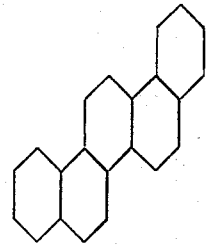

or its hydrogenated derivatives.

These hydroxy compounds are often comparatively sensitive to high temperatures and other conditions. However, many of them are important starting compounds in the syntheses of hormones and other biologicals. Yet in some of the reactions to which the compounds are subjected it is desirable to protect the hydroxyl oxygen from loss or from conversion to carbonyl form. It may also be desirable to convert the hydroxyl to ester form in order to increase the polarity of the compound or to provide reactive or labile groups.

It has now been discovered that these higher alcohols can easily be esterified by interchange or alcoholysis with cyanoacetic acid esters at very moderate temperatures to provide esters of great utility.

Examples of those higher alcohols which can readily be esterified with cyanoacetic acid esters by ester interchange reaction include:

Sterols such as:
    Ergostanetriol or ergostadienetriol
    Cholesterol
    Beta sitosterol
    Stigmasterol
    Cholestanol
    Epidehydroandrosterone
    Ergosterol
    Epicholestanol
    Coprostanol
    Cortisone
    Cholic acid
    Desoxycholic acid
    Steroid sapogenins
    Steroid intermediates
Triterpene alcohols such as:
    Agnosterol
    Lanosterol It will also be understood that cyanoacetic esters of higher alcohols may be prepared including esters of the following:

Aliphatic compound containing at least 6 and usually containing 16 or more carbon atoms and containing alcoholic hydroxyl groups, such as:
    Octadecyl alcohol
    Lauryl alcohol
    Ceryl alcohol
    Cetyl alcohol
    Carnaubyl alcohol
    Lignoceryl alcohol
Polyhydroxy compounds such as:
    Decamethylene glycol
    Glycerine
    Ethylene glycol
    Polyethylene glycol and polyethylene oxide resins or waxes and like waxy resins which are soluble in solvents of fats
Ether alcohols such as:
    Butyl carbitol
    Propyl carbitol
Hydroxy glyceride oils such as:
    Castor oil
    Mono- and di- glycerides which are soluble in solvents of fats
    Synthetic hydroxy glycerides
Cyclic and polycyclic alcohols
    Cyclohexanol
    Hydroxy decalin
    Polyhydric alcohol-polybasic acid resins such as glycerol phthalate, glycerol or glycol maleate and like esters of polyhydric alcohols, including glycerol, ethylene glycol, propylene glycol, diethylene glycol, trimethylene glycol, etc. with polybasic acids such as phthalic, succinic, maleic, fumaric, itaconic, oxalic, terephthalic, or adipic acid or monohydric alcohol or monobasic acid modified resins of this character
    Diamyl carbinol
    Diethylene glycol
    1,2-dichloropropanol-3
    Pentaerythritol
    Linoleyl alcohol
    Nitro alcohols such as:
        2-methyl, 2-nitropropyl alcohol
        2-nitrobutyl alcohol and others.

It is desirable that the esters produced by interchange between the original ester of cyanoacetic acid and the higher alcohols be of a boiling point above that of the initial cyanoacetic acid ester.

Obviously the hydroxy compound which is to undergo interchange with the cyanoacetc acid ester should be soluble in the latter or at least should be soluble in a solvent that is mutually compatible therewith.

CONDITIONS OF REACTION

The conditions of reaction employed to effect the ester interchange between the hydroxy compounds and the cyanoacetic acid esters such as herein disclosed may vary, dependent upon the ester and the hydroxy compound. However, a special advantage of the process herein contemplated is that the conditions may be relatively mild thus insuring high yield and minimizing loss through decomposition. Catalysts are usually omitted, but may be present if purity of product is not important.

The temperatures of reaction should be sufficiently high to drive off the evolved lower alcohol quite rapidly. Preferably it should be driven off substantially as fast as it is liberated in the reaction mixture. The temperature of operation normally ranges between 50 and 150° C., preferably below 120° C. The temperature should be below the point of decomposition of the reactants or of the desired reaction product. A good average temperature is approximately 90 to 100° C. (steam bath temperature) and rarely above 120° C. The temperature can also be reduced below this value and may be conducted at room temperature where the excess of the ester used is large and the time of reaction is long, for example 24 hours or even several weeks. However, it is understood that as the temperature approaches or is reduced below the normal boiling point of the lower alcohol evolved in the system it is desirable to apply vacuum, or otherwise to attain low pressure of evolved alcohol in order to promote removal of the latter. Higher temperatures, preferably below 150° C., are permissible so long as side reactions do not seriously interfere with the yield of ester.

The approach of the upper limit of the temperature of reaction can, in many cases, be determined or detected by a tendency of the reaction mixture to darken, indicating decomposition reactions in the mixture. If any tendency so to discolor is observed, the temperature should be reduced at once until it ceases. It is usually preferred to employ a temperature above the boiling point at operating pressures of the lower alcohol evolved in the system. This facilitates removal of the lower alcohol and causes the reaction to proceed rapidly and smoothly to completion.

It is a principle of the present invention that the concentration of evolved lower alcohol such as methyl alcohol, ethyl alcohol, or the like, dependent upon the alkyl radical of the cyanoacetic acid ester, should be maintained at a relatively low value in the reaction mixture, or at least before the final conclusion of the reaction, the concentration of the lower alcohol should be carried to a low value.

A plurality of modes of attaining this low relative concentration of the evolved alcohol are permissible. For example, the system may be maintained under relatively high vacuum during the reaction, thus stripping off the lower alcohol as it is formed while permitting the temperature of reaction to stay relatively low. Any cyanoacetic acid ester of a lower alcohol carried over as a vapor in the lower alcohol vapor stripped off can be condensed and returned to the reaction zone. In this way, the concentration of the original cyanoacetic acid ester in the system is maintained.

According to a further embodiment, the lower evolved alcohol may be stripped off by blowing the reaction mixture with a non-reactive vapor or gas, e. g., nitrogen, $CO_2$ or the like. Water, as such in the system, is to be avoided.

Still another convenient method of attaining low concentration of evolved alcohol in the system comprises dilution of the alcohol of reaction by employing a high molecular excess of the cyanoacetic acid ester of the lower alcohol. For example, the molecular ratio of the cyanoacetic acid may be 5, 10, 20 or even 100 times that of the alcohol to be esterified. In most of such instances the original ester will be employed in a molecular ratio of at least two moles of original ester per mole of alcohol to be esterified. The excess can be added initially or it can be added or increased as the reaction proceeds.

Combinations of these several methods are within the scope of this invention. For example, a 2 to 100 mole excess of the cyanoacetic acid ester of a lower alcohol can be employed and at the same time, the alcohol of reaction can be removed as it is evolved. In this way, extremely low percentages of the lower alcohol are permitted to be established in the system. In such system, stripping of evolved alcohol may be effected by simple distillation at atmospheric pressure, by vacuum distillation, or by blowing the reaction mixture with a non-reactive gas or vapor.

By properly reducing the concentration of the evolved lower alcohol in the system, it is possible to obtain yields of higher esters of cyanoacetic acid of 90%, or even of practically quantitative values. e. g., 98 or 99% without discloration of the product or the reactants.

If care is observed to maintain the reaction temperature reasonably low and at the same time to distill off under vacuum, or otherwise remove or decrease the alcohol evolved by reaction, highly efficient ester interchange can be effected with equimolar ratios of the higher alcohol and the cyanoacetic acid ester of a lower alcohol or with but a slight excess of the latter ester. However, it is usually more convenient to operate with an excess of cyanoacetic acid ester which is substantial, e. g., 10% or preferably larger (on a molar basis) of the starting cyanoacetic acid ester.

When the reaction nears completion the excess of original ester can be distilled off. Vacuum may be applied to promote the distillation within the permissible temperature limits in order that there may be no decomposition of any of the compounds. An absolute pressure of about 5 to 50, e. g., 15 millimeters of mercury is usually satisfactory for distilling off this excess of cyanoacetic ester but such other subatmospheric pressures as will remove the excess ester at permissible temperatures may be employed. The distillation may be conducted at or near the original reaction temperature. In any event, the temperature should not exceed 180° C. and usually will be below 120 or perhaps 140° C. Of course, if absolute purity of products is not necessary the excess cyanoacetate may be removed by distillation at atmospheric pressure, thereby producing products which are somewhat contaminated due to the decomposition of compounds at these higher temperatures. The distillation of the excess cyanoacetic acid ester of lower alcohol is important because it usually first distills off all or most of any lower alcohol in the system, thus reducing the concentration of the latter with respect to the original cyanoacetic acid ester still present and assuring that if higher alcohol is still present in the system, the ester interchange is finally completed at moderate temperatures.

The main features involved in the process as herein disclosed thus may be summarized as follows:

1. The alcohol which is selected to undergo ester interchange should be one that does not undergo side reactions by reason of decomposition or rearrangement or by reason of reactions other than ester interchange with the cyanoacetic acid ester of the lower alcohol. It should also be of substantially higher boiling point than the alcohol which is liberated by the reaction.

2. The amount of the cyanoacetic acid ester of a lower alcohol should be at least in equimolar proportion with respect to the alcohol to be subjected to ester interchange and preferably it should be in substantial excess. In the production of esters of many alcohols it is necessary to use an appreciable excess, for example 50% (molar basis) or more of the cyanoacetic ester in order to dissolve the alcohol being esterified and/or to insure improved yields.

3. The concentration of the evolved alcohol in the reaction mixture should be maintained as low as is feasible, e. g., not in excess of about 33 molar percent and preferably less with respect to the original amount of the cyanoacetic acid ester of a lower alcohol. This may be effectively accomplished in several ways as, for example, by distilling off the lower alcohol as formed either at atmospheric pressure or under diminished pressure with the use of diminished pressure during the later stages of the reaction being particularly advantageous, or by blowing with an inert gas, or vapor, or by maintenance of a large excess of the cyanoacetic acid ester.

4. Catalysts of reaction are not necessary. They may, however, at times be used.

5. The temperature of the ester interchange should be moderate, e. g., 50 to 120° C. and in any event not above about 160° C.. Satisfactory upper limits of temperature are determinable by observation of the initiation of decomposition reactions.

6. The temperature of reaction should be maintained until the lower alcohol ceases, or substantially ceases to evolve.

7. Non-reactive solvents or solvents other than the excess of cyanoacetic acid and a lower alcohol are not ordinarily necessary in the reaction. However, it will be apparent that non-reactive liquid media which are common solvents of the system may also be employed if so desired.

8. It is desirable, at the conclusion of the reaction, to distill off any excess of cyanoacetic acid ester of lower alcohol present in the reaction mixture along with any residual alcohol evolved by the reaction by distillation. If this latter precaution is observed, any unreacted higher alcohol still present in the system will be induced to undergo reaction and thereby carry the reaction substantially to completion.

The esters of cyanoacetic acid which have been prepared within the scope of this invention are, in general, high molecular weight solids or liquids. They may be used for various purposes. Sterol esters are largely crystalline solids. They are soluble in acetone, methyl acetate, and like ketone or ester solvents. They are especially useful as pharmaceuticals, or as intermediates for production of modified sterols.

The esters of the other higher alcohols may be used as plasticizers, waxes, etc. and also for the purpose of producing intermediates which may be resinous or non-resinous.

The following examples illustrate the application of the principles of the invention.

*Example I*

Five grams of cholesterol, 150 grams of ethyl cyanoacetate and 25 grams of toluene were placed in an appropriate flask adapted to permit free escape of evolved vapor and the mixture was heated on a steam bath at a temperature of about 90 to 100° C. for 8 hours. At the conclusion of this time, the reaction was substantially complete. Accordingly, the solvent and the excess of ethyl cyanoacetate were stripped off under vacuum, e. g., at a pressure of 15 millimeters (absolute) and the remaining white solid in a yield of 5.3 grams and of a saponification value of 116 was crystallized from an isopropyl alcohol-acetone mixture of a composition of 2 parts isopropanol and 1 part acetone. A solid crystalline product was obtained having a melting point of 182 to 183° C. This product is cholesteryl cyanoacetate. When beta sitosterol, stigmasterol, ergosterol, cortisone or like sterols are substituted in equivalent amount for cholesterol, the reaction occurs in the same way and crystalline cyanoacetic esters of these sterols are obtained. Methyl or propyl cyanoacetic acid ester can be substituted for ethyl cyanoacetic acid ester in the reaction of this example. It will likewise be apparent that lower esters of substituted cyanoacetic acid containing a methyl, ethyl, or propyl group substituted for one of the hydrogen on the carbon atom alpha to the carbonyl (C=O) group with the consequent production of the corresponding sterol esters.

*Example II*

Five grams of stearyl alcohol and 50 grams of ethyl cyanoacetate are heated on the steam bath at a temperature of about 90 to 100° C. for 17 hours. Thereupon, the excess of ethyl cyanoacetate together with any residue of ethyl alcohol remaining in the system were stripped off under vacuum, e. g., at a pressure of 15 millimeters (absolute). There was obtained 5.5 grams of pure stearyl cyanoacetate of a melting point of 55 to 56° C. and of a saponification value of 166.

The equivalent amount of palmitic, lauryl, oleyl, linoleyl, eleostearyl, or other higher alcohol can be substituted for stearyl alcohol with consequent production of the corresponding cyanoacetates.

*Example III*

Ten grams of cholesterol and 100 cc. of methyl cyanoacetic acid ester and 50 cc. toluene are mixed together. The mixture is heated on a steam bath at a temperature of about 90 to 100° C. and at atmospheric pressure for 15 hours. During the reaction, carbon dioxide is bubbled through the reaction mixture to effect thorough removal of the evolved methyl alcohol from the reaction zone. Finally, the excess cyanoacetic acid ester and toluene are distilled off under an absolute pressure of about 15 millimeters leaving the desired cyanoacetic acid ester of cholesterol.

*Example IV*

Ten grams of cholesterol is mixed with 100 cc. of methyl cyanoacetate and 50 cc. toluene and the mixture is heated upon the steam bath as above described for 15 hours at a pressure of 40 millimeters of mercury (absolute). During the course of the reaction, methyl alcohol is evolved and it, the unreacted methyl cyanoacetate, and toluene are distilled off. The cholesteryl cyanoacetate remains behind.

The foregoing examples illustrate the application of the ester interchange reaction to individual sterols or other higher alcohols in pure state. It will be apparent that the alcohol compound to undergo ester interchange need not be pure. Various glyceride oil mixtures containing sterols in substantial amounts may be reacted to produce sterol cyanoacetate. For example, a soap stock which normally contains considerable amounts of sterols, may be treated with methyl or ethyl cyanoacetate in accordance with the provisions of the invention to form cyanoacetic esters of sterols in admixture with glycerides of fatty acids or in admixture with fatty acids or various combination of the glycerides and fatty acids or other constituents of the mixtures. The temperatures of reaction and other conditions correspond to those herein disclosed. Many other mixtures of fat-like products likewise include sterols which are susceptible of treatment in accordance with the provisions of the present invention.

Wool fat, for example, includes considerable amounts of cholesterol and such cholesterol-containing material may be treated with an excess of ethyl or methyl cyanoacetate at temperatures near 100° C. to form cholesteryl esters of cyanoacetic acid in the mixture. These cholesterol esters can be recovered by solvent extraction or by other appropriate methods.

Likewise, tall oil as obtained in the digestion of paper pulp is rich in sterols and notably in beta sitosterol. The distillation residues obtained after partial distillation of the resin acids and fatty acids of tall oil are especially enriched in beta sitosterol. The crude mixtures can be treated with methyl or ethyl cyanoacetate to provide esters of beta sitosterol in admixture with rosin acids, fatty acids, and the like other impurities of the tall oil residue.

The following example illustrates the application of the principles of the invention in the preparation of cyanoacetic esters of a crude or purified beta sitosterol.

*Example V*

On hundred grams of unsaponifiable fraction of tall oil which consists largely of beta sitosterol together with some higher aliphatic alcohols and other materials may be heated with 200 grams of methyl cyanoacetate and 500 grams of xylene to a temperature of about 100° C. for 24 hours. The excess of methyl cyanoacetate and the xylene are then distilled off under a pressure of about 10 millimeters of mercury (absolute) to obtain a residue containing the desired beta sitosteryl ester of cyanoacteic acid.

When a polyhydroxy sterol is used in accordance with one of the above examples using at least one mole of ester per mole of hydroxy group in the sterol such as Examples I or II, the corresponding cyanoacetic esters such as ergostane mono, di or tri cyanoacetate result.

Although the present invention has been described with reference to certain embodiments thereof, it is not intended that the specific details of such embodiments shall be regarded as limitations upon the scope of this invention except insofar as included in the accompanying claims.

I claim:
1. A method of forming an ester of a cyanoacetic acid and a sterol, which comprises heating a mixture of said sterol and an interchangeable ester of a lower monohydric aliphatic alcohol and said acid, said interchangeable ester being in excess of stoichiometric proportion with respect to the sterol, and removing the evolved lower alcohol during the heating operation, whereby ester interchange between said higher alcohol and said interchange ester is effected.

2. The method of claim 1 in which the interchange ester alcohol is of cyanoacetic acid.

3. The method of claim 1 in which the sterol is cholesterol.

4. The method of claim 1 in which the sterol is sitosterol.

5. The method of claim 1 in which the lower alcohol of the interchangeable ester is of 1 to 2 carbon atoms.

6. The method of claim 1 in which the heating operation is performed in the substantial absence of catalysts.

7. A method of preparing an ester which comprises heating a cyanoacetic acid ester of a lower aliphatic monohydric alcohol with a sterol and distilling off the evolved lower alcohol.

8. A method of preparing an ester of a sterol, which comprises heating in the absence of catalyst a mixture of a sterol and a lower aliphatic monohydric alcohol ester of cyanoacetic acid, and distilling of the evolved lower alcohol while the esterification is in progress.

9. The method of claim 8 in which evolved lower alcohol is continuously removed from the reaction system as it is formed.

References Cited in the file of this patent

UNITED STATES PATENTS

| Number | Name | Date |
|---|---|---|
| 1,433,308 | Steffens | Oct. 24, 1922 |
| 2,078,978 | Schwenk | May 4, 1937 |
| 2,125,772 | Dierscherl | Aug. 2, 1938 |
| 2,244,968 | Schwenk | June 10, 1941 |
| 2,323,584 | Schoeller | July 6, 1943 |
| 2,426,056 | Rust | Aug. 19, 1947 |
| 2,545,094 | Long | Mar. 13, 1951 |

OTHER REFERENCES

Rule et al., Jour. Chem. Soc. 127, 2188–2194 (1925).
Page et al., Biochemish. Zeitschrift 220, 304–326 (1930).
Newman, Jour. Am. Chem. Soc. 68, 2112–15 (1946).